United States Patent
Christopher et al.

(10) Patent No.: US 10,417,006 B2
(45) Date of Patent: Sep. 17, 2019

(54) UNIFIED METHOD TO SEND BIOS POST CODES TO BMC

(71) Applicant: American Megatrends International, LLC, Norcross, GA (US)

(72) Inventors: Samvinesh Christopher, Suwanee, GA (US); Anurag Bhatia, Lilburn, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 55 days.

(21) Appl. No.: 15/224,969

(22) Filed: Aug. 1, 2016

(65) Prior Publication Data

US 2018/0032345 A1    Feb. 1, 2018

(51) Int. Cl.
| | |
|---|---|
| G06F 9/44 | (2018.01) |
| G06F 9/4401 | (2018.01) |
| G06F 13/42 | (2006.01) |
| G06F 13/10 | (2006.01) |
| H04L 29/08 | (2006.01) |

(52) U.S. Cl.
CPC .......... *G06F 9/4401* (2013.01); *G06F 9/4411* (2013.01); *G06F 13/4282* (2013.01); *G06F 13/105* (2013.01); *H04L 67/2861* (2013.01)

(58) Field of Classification Search
CPC .... G06F 13/105; G06F 13/385; G06F 3/0664; G06F 13/107; G06F 9/455; G06F 9/4411; G06F 9/4401; H04L 67/2861
See application file for complete search history.

(56) References Cited

U.S. PATENT DOCUMENTS

| | | | |
|---|---|---|---|
| 2007/0005867 A1* | 1/2007 | Diamant | G06F 13/385 710/306 |
| 2013/0007224 A1* | 1/2013 | Yang | H04L 67/08 709/219 |
| 2016/0328300 A1* | 11/2016 | Rahardjo | G06F 11/1417 |

\* cited by examiner

*Primary Examiner* — Ernest Unelus
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device emulates a USB device. The embedded-system device exposes the emulated USB device to a host of the embedded-system device through a USB connection. The embedded-system device receives data from BIOS of the host through the emulated USB device.

20 Claims, 4 Drawing Sheets

UNIFIED METHOD TO SEND BIOS POST CODES TO BMC

BACKGROUND

Field

The present disclosure relates generally to embedded-system devices, and more particularly, to techniques of sending Basic Input/Output System (BIOS) Power On Self Test (POST) procedure codes by a Human Interface Device (HID) device to hosts of various architectures.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. The BMC may be considered as an embedded-system device.

BIOS on INTEL X86 systems may use IO port 80 to send POST codes to a BMC during its booting process. To log POST codes, the BMC may capture access to IO port 80. Non-INTEL X86 architectures may not provide IO ports. Thus, a BMC cannot get POST codes utilizing an IO port. Further, each host architecture may implement its own method to send POST codes to a BMC. Therefore, there is a need to define a unified way of sending POST codes to BMCs using a standard interface available in all host architectures.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device emulates a Universal Serial Bus (USB) device. The embedded-system device exposes the emulated USB device to a host of the embedded-system device through a USB connection. The embedded-system device receives data from BIOS of the host through the emulated USB device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

BIOS on INTEL X86 systems may use IO port 80 to send POST codes to a BMC during its booting process. To log POST codes, the BMC may capture access to IO port 80. Non-INTEL X86 architectures may not provide IO ports. Thus, a BMC cannot get POST codes utilizing an IO port. Further, each host architecture may implement its own method to send POST codes to a BMC. Therefore, there is a need to define a unified way of sending POST codes to BMCs using a standard interface available in all host architectures.

As described infra, USB HID pipe communication can be used by a host to send BIOS POST Codes to a BMC. USB HID Devices support a control pipe. The control pipe is for bi-directional communication and can send, e.g., 8 or 64 bytes in single transfer. The control pipe can be utilized by a host to send POST codes to a BMC. In particular, BIOSes or bootloaders of hosts of various architectures can load USB drivers for HID devices (e.g., keyboards or mice). This enables a BMC to connect to the host via a USB connection and enables the BIOS to use a USB HID control pipe to send POST codes.

Figure 1:
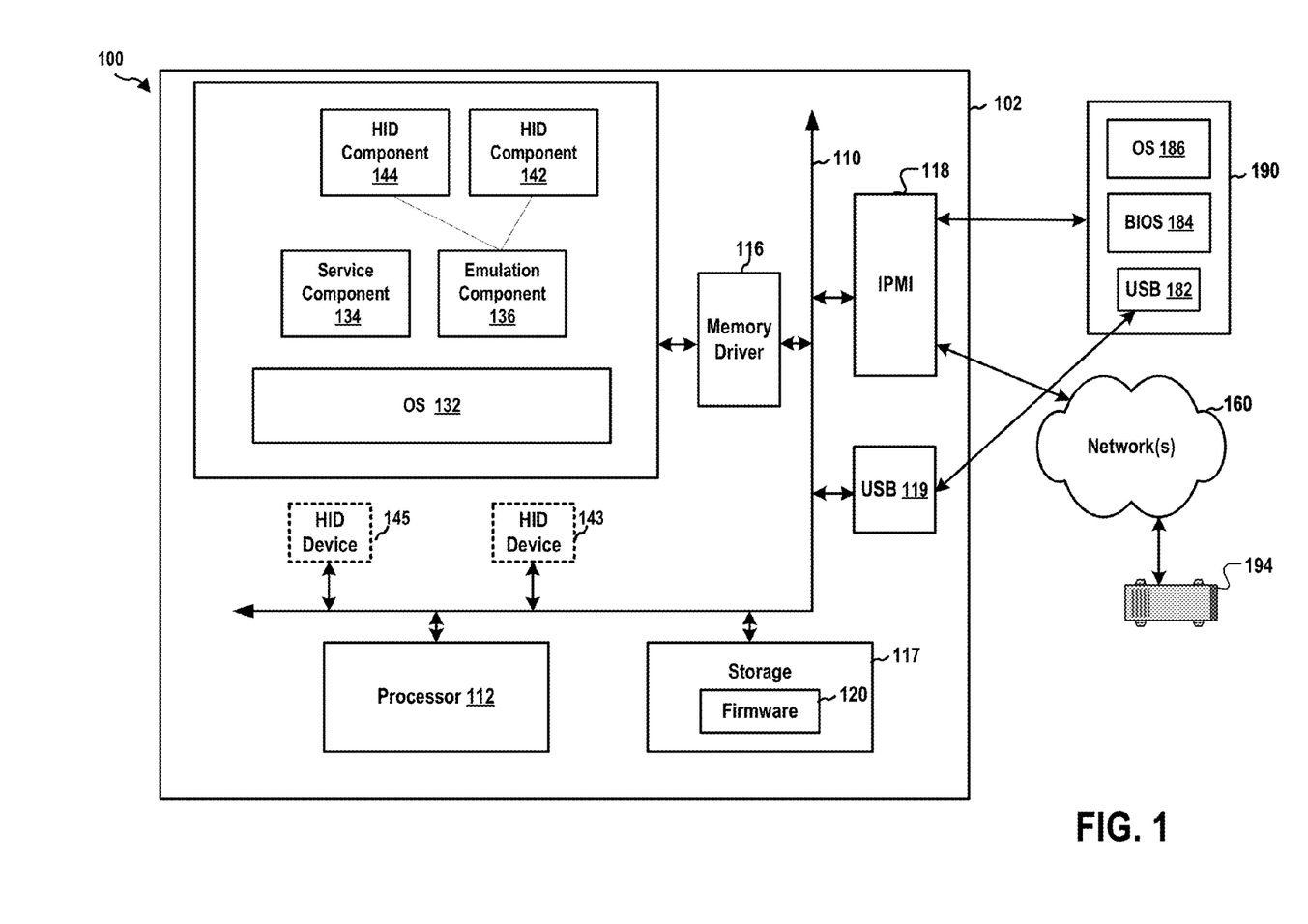
FIG. 1 is a diagram illustrating a computer system.

FIG. 1 is a diagram 100 illustrating a computer system. In this example, the computer system includes, among other things, a BMC 102 and a host computer 190. The BMC 102 has a processor 112, a memory 114, a memory driver 116, a USB connection component 119, and a storage 117. Further, the BMC 102 may support IPMI and may have an IPMI interface 118. The memory 114, the processor 112, the memory driver 116, the storage 117, the USB connection component 119, and the IPMI interface 118 may be in communication with each other through a communication channel 110 such as a bus architecture.

The BMC 102 may be in communication with, through the IPMI interface 118, the host computer 190 and/or a network device 194. The IPMI communication between the BMC and the network device 194 may be carried over a network 160. The BMC may manage the host computer 190. The host computer 190 includes a BIOS 184. When the host computer 190 initially starts, the host computer 190 executes the BIOS 184 in order to boot a host OS 186. The host computer 190 also has a USB connection component 182. The BMC 102 may be in communication with the host computer 190 through the USB connection component 119 and the USB connection component 182. In certain configurations, as described infra, the BMC 102 may emulate one or more USB devices. As such, from the perspective of the host computer 190, the host computer 190 may perceive that the one or more USB devices are connected to the host computer 190 through the USB connection component 182.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, a service component 134, and an emulation component 136. Further, the emulation component 136 may emulate one or more USB devices connected to the USB connection component 119. For example, the emulation component 136 may emulate a CD drive, a flash drive, a hard drive, etc. connected to the USB connection component 119. In particular, the emulation component 136 may construct a HID component 142, which may emulate a HID device 143. As described infra, the host computer 190 may utilize the HID device 143 to send data generated by the BIOS 184 to the BMC 102. Further, the emulation component 136 may also construct a HID component 144, which may emulate a HID device 145 (e.g., a keyboard or a mouse etc.). The host computer 190 can detect the HID device 143 and the HID device 145 (which are emulated by the BMC 102) as devices connected to the USB connection component 182.

Further, the BIOS 184, when executed, recognizes the USB connection component 182 and is able to use a USB driver to operate the USB connection component 182. Through the USB connection component 182, the BIOS 184 further detects the HID device 143 and the HID device 145 emulated by the BMC 102. The BIOS 184 uses the USB driver to establish a control pipe with the HID device 143 and the HID device 145, respectively.

The BIOS 184 may perform a POST procedure. The POST procedure includes a series of individual functions or routines that perform various initialization and tests of the computers hardware such as motherboard hardware, CPU, the math coprocessor, timer IC's, DMA controllers, and/or IRQ controllers, etc. The POST procedure may generate data (e.g., POST codes) during execution.

The BIOS 184 may use the USB driver to send the data generated during the POST procedure to the HID device 143 through the USB connection component 182. More specifically, the USB driver may generate a USB token packet with an identifier indicating that the USB token packet and a subsequent USB data packet are used for transferring the data from the BIOS 184. For example, the identifier may be a packet identifier of the USB token packet. Further, the USB driver also sets up the USB token packet to indicate that the USB data packet is transferred from the host computer 190 to the HID device 143 on the control pipe. Following the USB token packet, the USB driver constructs a USB data packet containing the data from the BIOS 184. The USB driver may also set up an identifier (e.g., a packet identifier) in the USB data packet to indicate that the USB data packet contains data generated by the BIOS 184. Subsequently, the USB driver sends the USB data packet to the BMC 102 through the USB connection component 182.

The HID component 142 monitors the USB packets received at the USB connection component 119 and can detect, based on the indications (e.g., the packet identifiers) of the USB token packet and/or the USB data packet, the USB token packet and USB data packet destined for the HID device 143 and transferred on the control pipe. The HID component 142 accordingly obtains the USB data packet and extracts from the USB data packet the data generated by the BIOS 184. The HID component 142 then sends the data generated by the BIOS 184 to a service component 134 for processing. For example, the service component 134 may store the data in the storage 117.

Further, the BIOS 184 may instruct the USB driver to send commands and/or data to the HID device 145. The USB driver accordingly may construct a USB token packet and a USB data packet destined for the HID device 145 with the packet identifiers indicates information regarding the commands and/or data. The HID component 142 may detect those USB packets but does not further process the USB packets, as those USB packets do not contain an identifier indicating that the USB packets contain data from the BIOS 184. The HID component 144, on the other hand, obtains the USB packets (i.e., the USB connection component 119 sends the USB packets to the HID component 144) and further processes the USB packets.

Figure 2:
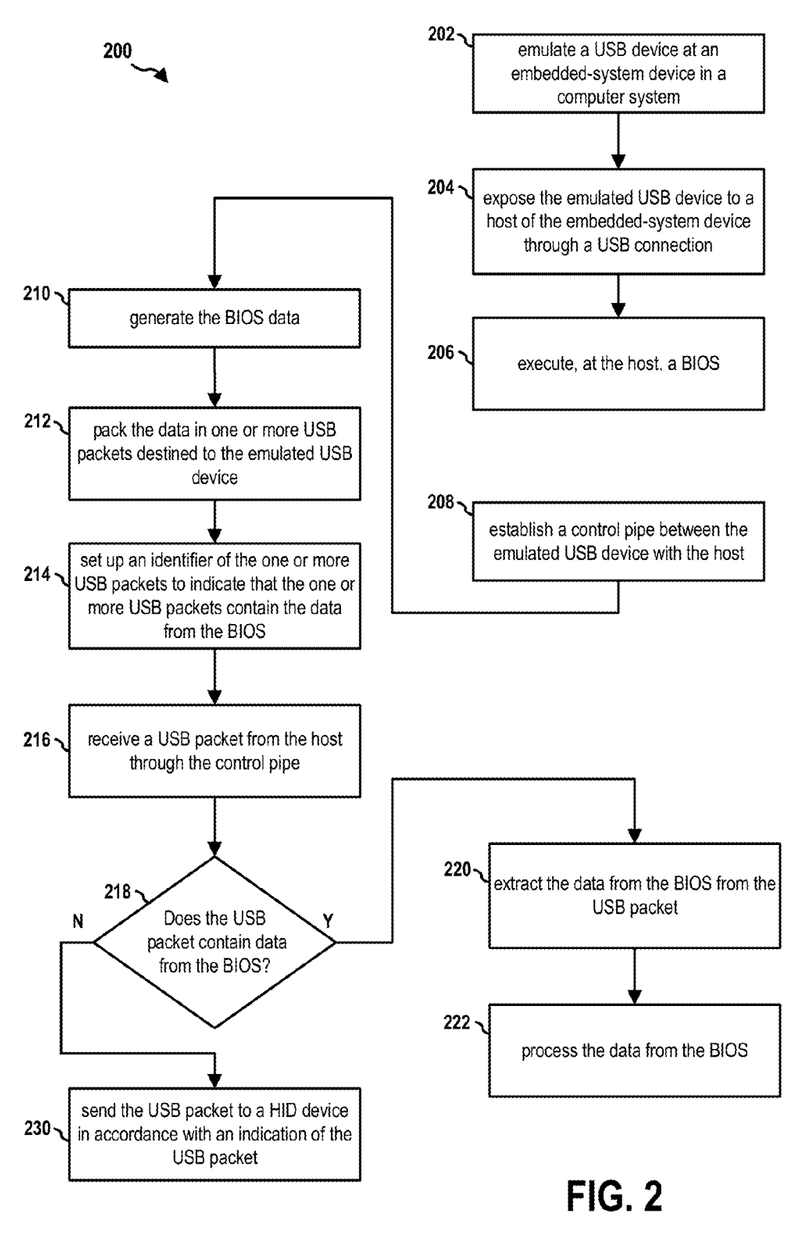
FIG. 2 is a flow chart of a method (process) for transferring POST codes.

FIG. 2 is a flow chart 200 of a method (process) for transferring POST codes. The method may be performed by a computer system including an embedded-system device and a host (e.g., the BMC 102, the apparatus 102', the host computer 190). At operation 202, the embedded-system device (e.g., the BMC 102) emulates a USB device (e.g., the HID device 143). In certain configurations, the emulated USB device is a HID device. At operation 204, the embedded-system device exposes the emulated USB device to the host (e.g., the host computer 190) of the embedded-system device through a USB connection (e.g., the USB connection component 119 and/or the USB connection component 182). At operation 206, the host executes a BIOS (e.g., the BIOS 184). At operation 208, the emulated USB device establishes a control pipe with the host. At operation 210, the BIOS of the host generates data. In certain configurations, the data is generated in a POST procedure of the BIOS. At operation 212, the host packs the data in one or more USB packets destined for the emulated USB device. At operation 214, the host sets up an identifier (e.g., a packet identifier) of the one or more USB packets to indicate that the one or more USB packets contain the data from the BIOS. At operation 216, the embedded-system device receives a USB packet from the host through the control pipe. In certain configurations, the data from the BIOS contain data generated in the POST procedure of the BIOS.

At operation 218, the embedded-system device determines whether the USB packet contains the data from the BIOS based on an identifier of the USB packet. When the USB packet contains the data from the BIOS, at operation 220, the embedded-system device extracts, from the USB packet, the data from the BIOS. At operation 222, the embedded-system device (e.g., utilizing the service component 134) processes the data from the BIOS. When the USB packet does not contain the data from the BIOS, at operation 230, the embedded-system device sends the USB packet to a HID device (e.g., the HID device 145) in accordance with an indication of the USB packet.

Figure 3:
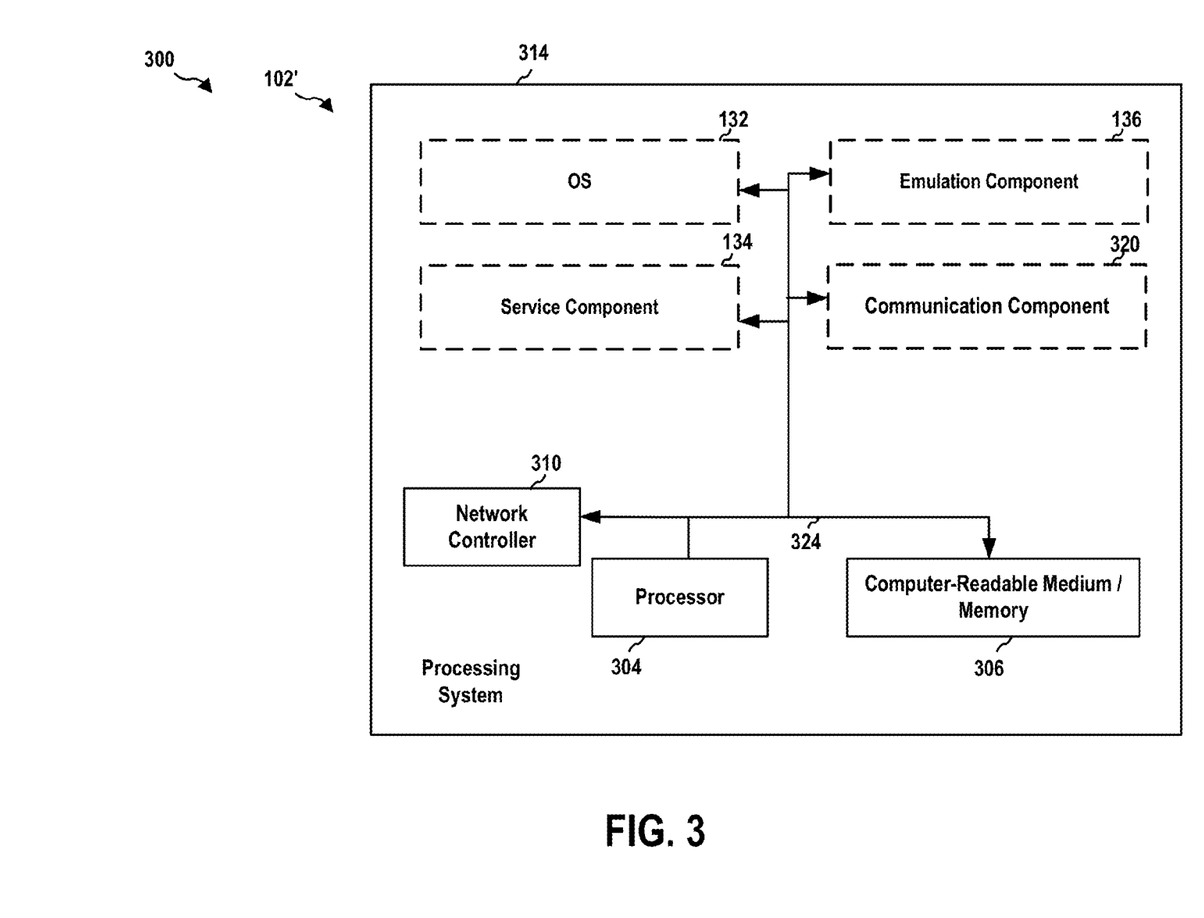
FIG. 3 is a diagram illustrating an example of a hardware implementation for an apparatus employing a processing system.

FIG. 3 is a diagram 300 illustrating an example of a hardware implementation for an apparatus 102' employing a processing system 314. The apparatus 102' may implement the BMC 102. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the OS 132, the emulation component 136, the service component 134, and the computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the OS 132, the emulation component 136, the service component 134. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102' and/or the processing system 314 of the apparatus 102' configured to perform the functions recited by the aforementioned means.

Figure 4:
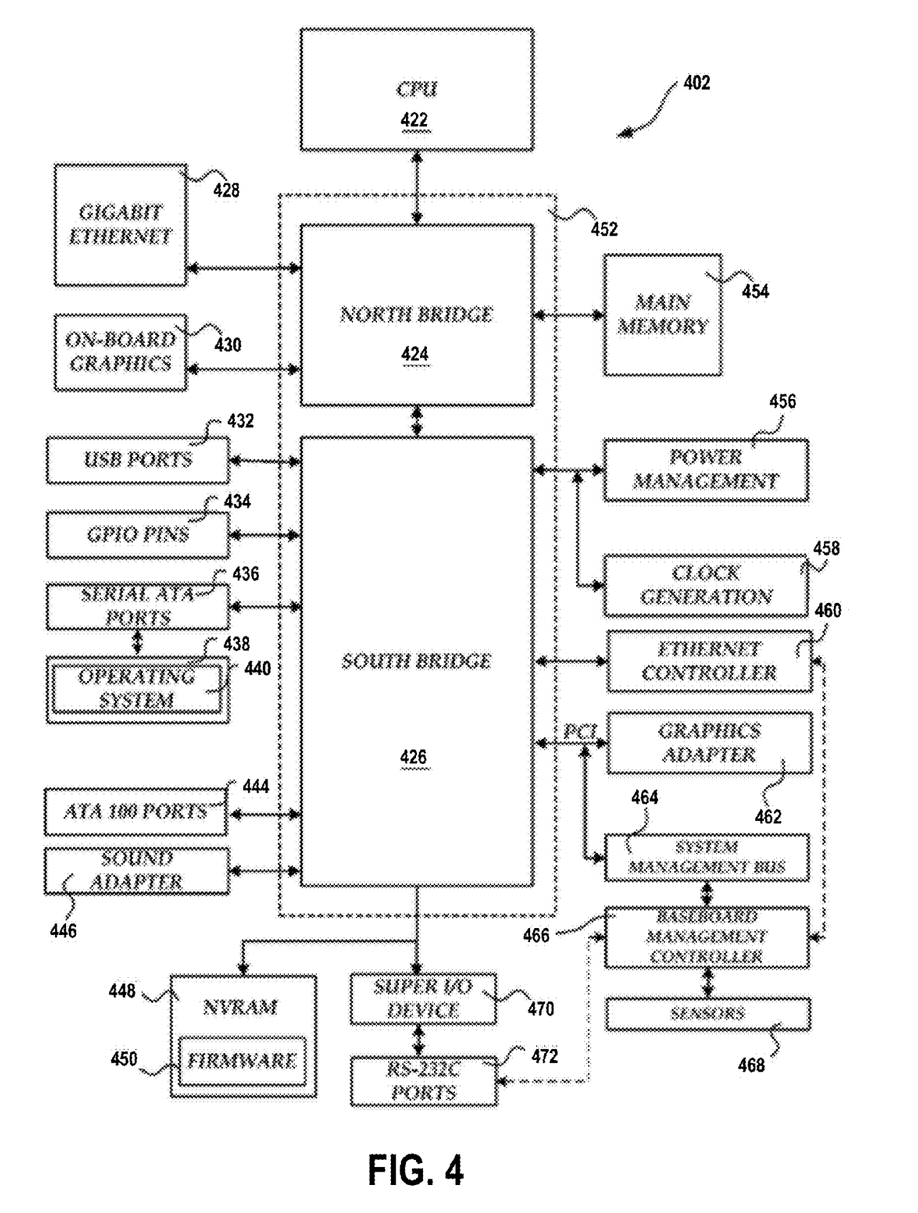
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICRO-SOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including hand-held computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system comprising a baseboard management controller (BMC) having a memory and at least one processor coupled to the memory, comprising:
   emulating, executed by the processor of the BMC, a Universal Serial Bus (USB) device within the BMC, wherein the emulated USB device is a device in the Human Interface Device (HID) Class defined by the USB Specification;
   exposing, executed by the processor of the BMC, the emulated USB device to a host of the BMC in the computer system;
   receiving, executed by the processor of the BMC, data from Basic Input/Output System (BIOS) of the host through a USB HID control pipe of the emulated USB device, the control pipe being different from a data pipe of the emulated USB device, wherein the data are generated by initialization and tests routines of the BIOS during testing hardware components of the host; and
   storing the data at the BMC.

2. The method of claim 1, wherein the initialization and tests routines are a Power On Self Test (POST) procedure of the BIOS, wherein the POST procedure tests at least one of motherboard hardware, a central processing unit (CPU), a math coprocessor, a timer integrated circuit (IC), a direct memory access (DMA) controller, and an interrupt request (IRQ) controller to generate POST codes, wherein the data includes POST codes.

3. The method of claim 1, further comprising:
   establishing, by the emulated USB device, a control pipe with the host, wherein the data from the BIOS is received through USB packets transferred on the control pipe.

4. The method of claim 3, the method further comprising:
   receiving a USB packet from the host through the control pipe;
   determining whether the USB packet contains the data from the BIOS based on an identifier of the USB packet; and
   when the USB packet contains the data from the BIOS:
   extracting, from the USB packet, the data from the BIOS; and
   processing the data from the BIOS.

5. The method of claim 4, the method further comprising, when the USB packet does not contain the data from the BIOS, sending the USB packet to a HID device in accordance with an indication of the USB packet.

6. The method of claim 1, the method further comprising, executing, at the host, the BIOS; and
   generating, by the BIOS, the data.

7. The method of claim 6, the method further comprising:
   packing, at the host, the data from the BIOS in one or more USB packets destined for the emulated USB device; and
   setting up an identifier of the one or more USB packets to indicate that the one or more USB packets contain the data from the BIOS.

8. A computer system comprising a baseboard management controller (BMC) having:
   a memory; and
   at least one processor coupled to the memory and configured to:
   emulate a Universal Serial Bus (USB) device within the BMC in the computer system, wherein the emulated USB device is a device in the Human Interface Device (HID) Class defined by the USB Specification;
   expose the emulated USB device to a host of the BMC in the computer system;
   receive data from Basic Input/Output System (BIOS) of the host through a USB HID control pipe of the emulated USB device, the control pipe being different from a data pipe of the emulated USB device, wherein the data are generated by initialization and tests routines of the BIOS during testing hardware components of the host; and
   store the data at the BMC.

9. The computer system of claim 8, wherein the initialization and tests routines are a Power On Self Test (POST) procedure of the BIOS, wherein the POST procedure tests at least one of motherboard hardware, a central processing unit (CPU), a math coprocessor, a timer integrated circuit (IC), a direct memory access (DMA) controller, and an interrupt request (IRQ) controller to generate POST codes, wherein the data includes POST codes.

10. The computer system of claim 8, wherein the at least one processor is further configured to:
  establish, by the emulated USB device, a control pipe with the host, wherein the data from the BIOS is received through USB packets transferred on the control pipe.

11. The computer system of claim 10, wherein the at least one processor is further configured to:
  receive a USB packet from the host through the control pipe;
  determine whether the USB packet contains the data from the BIOS based on an identifier of the USB packet; and
  when the USB packet contains the data from the BIOS:
    extract, from the USB packet, the data from the BIOS; and
    process the data from the BIOS.

12. The computer system of claim 11, wherein the at least one processor is further configured to, when the USB packet does not contain the data from the BIOS, send the USB packet to a HID device in accordance with an indication of the USB packet.

13. The computer system of claim 8, wherein the at least one processor is further configured to,
  execute, at the host, the BIOS; and
  generate, by the BIOS, the data.

14. The computer system of claim 13, wherein the at least one processor is further configured to:
  pack, at the host, the data from the BIOS in one or more USB packets destined for the emulated USB device; and
  set up an identifier of the one or more USB packets to indicate that the one or more USB packets contain the data from the BIOS.

15. A non-transitory computer readable medium storing computer executable code for operating a computer system including a baseboard management controller (BMC), comprising code to:
  emulate a Universal Serial Bus (USB) device within the BMC in the computer system, wherein the emulated USB device is a device in the Human Interface Device (HID) Class defined by the USB Specification;
  expose the emulated USB device to a host of the BMC in the computer system;
  receive data from Basic Input/Output System (BIOS) of the host through a USB HID control pipe of the emulated USB device, the control pipe being different from a data pipe of the emulated USB device, wherein the data are generated by initialization and tests routines of the BIOS during testing hardware components of the host; and
  store the data at the BMC.

16. The non-transitory computer-readable medium of claim 15, wherein the initialization and tests routines are a Power On Self Test (POST) procedure of the BIOS, wherein the POST procedure tests at least one of motherboard hardware, a central processing unit (CPU), a math coprocessor, a timer integrated circuit (IC), a direct memory access (DMA) controller, and an interrupt request (IRQ) controller to generate POST codes, wherein the data includes POST codes.

17. The non-transitory computer-readable medium of claim 15, wherein the at least one processor is further configured to:
  establish, by the emulated USB device, a control pipe with the host, wherein the data from the BIOS is received through USB packets transferred on the control pipe.

18. The non-transitory computer-readable medium of claim 17, wherein the at least one processor is further configured to:
  receive a USB packet from the host through the control pipe;
  determine whether the USB packet contains the data from the BIOS based on an identifier of the USB packet; and
  when the USB packet contains the data from the BIOS:
    extract, from the USB packet, the data from the BIOS; and
    process the data from the BIOS.

19. The non-transitory computer-readable medium of claim 18, wherein the at least one processor is further configured to, when the USB packet does not contain the data from the BIOS, send the USB packet to a HID device in accordance with an indication of the USB packet.

20. The non-transitory computer-readable medium of claim 15, wherein the at least one processor is further configured to,
  execute, at the host, the BIOS; and
  generate, by the BIOS, the data;
  pack, at the host, the data from the BIOS in one or more USB packets destined for the emulated USB device; and
  set up an identifier of the one or more USB packets to indicate that the one or more USB packets contain the data from the BIOS.

* * * * *